United States Patent
Nourry et al.

(10) Patent No.: US 8,548,164 B2
(45) Date of Patent: Oct. 1, 2013

(54) METHOD AND DEVICE FOR THE ENCRYPTION AND DECRYPTION OF DATA

(75) Inventors: Pascal Nourry, Rennes (FR); Stéphanie Relier, Domloup (FR); François Daude, Pace (FR)

(73) Assignee: France Telecom, Paris (FR)

( * ) Notice: Subject to any disclaimer, the term of this patent is extended or adjusted under 35 U.S.C. 154(b) by 676 days.

(21) Appl. No.: 11/630,248

(22) PCT Filed: Jun. 14, 2005

(86) PCT No.: PCT/FR2005/001474
§ 371 (c)(1),
(2), (4) Date: Nov. 30, 2007

(87) PCT Pub. No.: WO2006/008362
PCT Pub. Date: Jan. 26, 2006

(65) Prior Publication Data
US 2008/0187134 A1     Aug. 7, 2008

(30) Foreign Application Priority Data
Jun. 21, 2004 (EP) .................................... 04291561

(51) Int. Cl.
*H04L 29/00* (2006.01)
(52) U.S. Cl.
USPC ................. 380/29; 380/28; 380/44; 380/270
(58) Field of Classification Search
USPC ....................... 380/28, 29, 44, 270
See application file for complete search history.

(56) References Cited

U.S. PATENT DOCUMENTS

| 4,145,568 | A  |   | 3/1979  | Ehrat                          |
|-----------|----|---|---------|--------------------------------|
| 5,345,508 | A  | * | 9/1994  | Lynn et al. ............... 380/46 |
| 5,987,137 | A  | * | 11/1999 | Karppanen et al. ......... 380/28 |
| 6,400,824 | B1 | * | 6/2002  | Mansoorian et al. ........ 380/269 |
| 6,917,684 | B1 | * | 7/2005  | Tatebayashi et al. ......... 380/44 |
| 7,158,637 | B2 | * | 1/2007  | Ohta et al. .................. 380/37 |
| 2002/0044651 | A1 |   | 4/2002  | Tuvell                         |
| 2005/0013277 | A1 |   | 1/2005  | Marque-Pucheu                  |
| 2005/0100163 | A1 | * | 5/2005  | Buer ......................... 380/259 |
| 2006/0050887 | A1 | * | 3/2006  | Chen ......................... 380/270 |

FOREIGN PATENT DOCUMENTS

FR    2 843 258    2/2004

OTHER PUBLICATIONS

Kent, S., et al., Security Architecture for the Internet Protocol, Network Working Group, The Internet Society, Nov. 1998, pp. 1-66.
Baugher, M., et al., The Secure Real-Time Transport Protocol (SRTP), Network Working Group, The Internet Society, Mar. 2004, pp. 1-56.

(Continued)

*Primary Examiner* — Brandon Hoffman
*Assistant Examiner* — Michael D Anderson
(74) *Attorney, Agent, or Firm* — Knobbe Martens Olson & Bear LLP

(57) ABSTRACT

Digital data blocks are encrypted, each data block that is to be encrypted being associated with a time reference. A value of an initialization vector Vi and an encryption key K are defined. Then, a counter C is obtained for each data block to be encoded, by combining the time reference and the value of the initialization vector. A series of binary encryption elements is obtained via an encryption function taking the encryption key K and counter C as input parameters. The data block is then encrypted by combining it with the series of binary encryption elements.

17 Claims, 4 Drawing Sheets

(56) References Cited

OTHER PUBLICATIONS

ETR 289, Digital Video Broadcasting (DVB); Support for Use of Scrambling and Conditional Access (CA) Within Digital Broadcasting Systems, Oct. 1996, pp. 1-13.

Announcing the Advanced Encryption Standard (AES), Federal Information Processing Standards Publication 197, Nov. 26, 2001, pp. 1-47.

Dworkin, M., Recommendation for Block Cipher Modes of Operation, NIST Special Publication 800-38A, 2001 Edition, pp. 1-59.

* cited by examiner

METHOD AND DEVICE FOR THE ENCRYPTION AND DECRYPTION OF DATA

This application claims priority from PCT/FR2005/01474, filed Jun. 14, 2005, which is hereby incorporated by reference in its entirety.

The present invention relates to the field of encryption in telecommunication networks.

BACKGROUND OF THE INVENTION

Cryptology, or even scrambling, or even encryption, consists in using secret conventions to transform information that can be understood by third parties into information that is unintelligible to third parties, or in carrying out the reverse operation, called decryption, using means known for this purpose.

In packet telecommunication networks, data packets are transmitted. A data packet conventionally comprises a datum containing transport information which is mainly linked to the transport processing in the network, and so-called payload data containing information that is mainly linked to the content of the message to be transmitted and that must be routed to the recipient.

In the existing networks, there are already numerous data encryption methods. Some of these methods offer to encrypt data packets at the transport data level.

Thus, in the field of Internet type networks, a protocol called IPsec, standing for "Internet Protocol security", is known, and is defined in the standard document "Security Architecture for the Internet Protocol", reference RFC 2401 (RFC standing for "Request For Comments"). Also known is a protocol named SRTP, standing for "Secure Real-Time Transport Protocol", which is defined in the standard document "The Secure Real-time Transport Protocol" referenced RFC 3711. Protocols of this type are known and suitable for encrypting data transmitted using an IP type protocol. They exhibit the drawback of not being adapted easily to other transport types such as, for example, the transport of multimedia files or even DVB (Digital Video Broadcast) type broadcasting in the networks.

Other solutions propose encryptions that are designed for and suited to encrypting data transmitted using a DVB type protocol. Particularly well known is an encryption function named DVB-CSA (CSA standing for "Common Scrambling Algorithm"), defined in a document referenced ETR 289 (standing for "European telecommunications standards institute Technical Report"). Such a function is particularly well-suited to use in an MPEG-2 TS (standing for MPEG2 Transport Stream, an audio and video sequence compression standard) type data stream.

One drawback of this type of encryption is that it does not specify a synchronization mechanism between data to be encrypted and encryption keys for use of such an encryption method in a transmission of data that is not encoded according to the MPEG-2 TS standard. Furthermore, a DVB-CSA type encryption function is not suited to encrypting audiovisual type payload data of variable sizes.

There are also encryption functions produced at the transported payload data level. Particularly well known in a multimedia network is a specification named ISMA Encryption and Authentication (ISMA standing for "Internet Streaming Media Alliance"), whereby multimedia type payload data can be encrypted. The ISMA encryption method entails modifying the header of each multimedia datum in order to include in it specific encryption information for synchronization purposes. This encryption information normally consists of public parameters such as, for example, a unique identifier for each datum to be encrypted or even an encryption key indicator.

One drawback of this type of encryption method is that it adds synchronization information which creates a not inconsiderable overhead in the transmission of such encrypted data. Such a method also poses problems of compatibility with existing software resulting from the modification of the header of the encrypted data.

Thus, there is an interest in defining an encryption method enabling the data transported in the telecommunication network to be encrypted in a way that is independent of the transport layer of the network used, without generating an overhead associated with this encryption method.

SUMMARY OF THE INVENTION

The present invention aims to propose a solution tending to satisfy these requirements.

A first aspect of the present invention proposes a method of encrypting digital data blocks, each data block to be encrypted being associated with a time reference, following which a value of an initialization vector VI and an encryption key K are defined.

The method comprises, for each data block to be encrypted, steps consisting in:
  obtaining a counter C, by combining said time reference and said value of the initialization vector;
  obtaining a series of encryption bits via an encryption function taking said encryption key K and said counter C as input parameters;
  encrypting said data block by combining it with said series of encryption bits.

The present invention therefore proposes an encryption method based on an encryption function which takes an encryption key and an initial counter as input parameters in order to combine them to deliver a series of encryption bits.

It will be noted that the term "data block" refers to a block comprising a set of data that can be an image, a soundtrack, or even multimedia data. Data of different types can therefore be contained in one and the same data block.

In order to ensure, for each data block to be encrypted, a uniqueness of the counter obtained by combining the time reference associated with the data block to be encrypted and the value of the initialization vector, a new value of the initialization vector is defined at a frequency such that the time references associated with the data blocks to be encrypted are unique for a given value of the initialization vector. This frequency is therefore normally a function of the length of the time reference associated with the data blocks to be encrypted.

In an embodiment of the invention, the data block to be encrypted corresponds to payload data that constitutes a processing unit at the sending end or the receiving end. In particular, when the data to be transmitted is a sequence of images, a data block to be encrypted can be an image. In practice, the process of encoding such data is normally performed one image at a time.

Then, after having encrypted and encoded the data block, depending on the size of the data block to be encrypted and the size of the packets of the transmission network, the data block is transported in one or more packets as the payload data of a packet.

The present invention covers other types of data blocks to be encrypted, provided that such a data block is associated with a time reference.

It is also possible to define the data block to be encrypted as the payload data of a packet to be transmitted in the network. In this case, a time reference associated with the packet can be used.

Regardless of the data block to be encrypted, the duly encrypted data blocks are packetized before they are transmitted through the network.

In one embodiment of the invention, the data block to be encrypted is subdivided into a number of sub-blocks of predetermined fixed length. There can therefore be a remaining final sub-block that is shorter than the predetermined length. Then, all the duly obtained sub-blocks are encrypted one after the other, including the final sub-block. An embodiment of this type is described in detail in the sections below.

It is thus possible to encrypt data on a transmission network regardless of the size of the data blocks to be encrypted. Because of this, data blocks of very variable sizes can be encrypted.

Such an encryption method according to an embodiment of the present invention also makes it possible to encrypt a data block independently of the other data blocks.

Furthermore, such an encryption method does not add any overhead associated with the encryption. In practice, the data is thus encrypted according to a time reference which is already included in the transmitted data, independently of the encryption.

Moreover, an encryption system applying a method according to an embodiment of the present invention can be interfaced easily with an encryption key and rights management system using the time references of the data packets as synchronization. Such systems are well known to those skilled in the art. They will not be detailed here.

Such a method also makes it possible to encrypt data packets independently of the transport layers of the transmission network. Thus, an embodiment of the present invention can be implemented in any data packet transmission network.

An encryption method according to the present invention can thus advantageously be applied in a multimedia data transport network. In this type of network, before being transmitted over the network, the multimedia data is normally encoded. Then, this data is decoded on reception. In this context, a data block to be encrypted can be defined as being the smallest part of the transmitted data that can be processed by an encoder and/or a decoder. Thus, when the transported data is a sequence of images, a data block to be encrypted can correspond to an image.

Depending on the transport network used, the data to be transmitted and the data to be encrypted, a packet transmitted over the network can include one or more encrypted data blocks, or only a part of an encrypted data block. The present invention advantageously covers all the possible data packet configurations.

A second aspect of the present invention proposes a device for encrypting digital data blocks, each data block being associated with a time reference, wherein a value of an initialization vector VI and an encryption key K are defined. Such a device comprises means arranged to implement an encryption method according to the first aspect of the present invention.

A third aspect of the present invention proposes a method of decrypting digital data blocks, each data block being associated with a time reference, the data blocks being encrypted by an encryption method according to the first aspect of the present invention.

A value of an initialization vector and an encryption key are defined synchronized with the value of the initialization vector and the encryption key used in the encryption method. The decryption method comprises, for each data block to be decrypted, steps consisting in:
obtaining a counter, by combining said time reference and said value of the initialization vector;
obtaining a series of decryption bits via a decryption function taking said encryption key and said counter as input parameters, said decryption function being equivalent to the encryption function used in said encryption method;
decrypting said encrypted data block by combining it with said series of decryption bits, via a combination that is the reverse of that used in said encryption method.

A fourth aspect of the present invention proposes a device for decrypting digital data blocks, each data block to be decrypted being associated with a time reference, and being encrypted by an encryption method according to the first aspect of the invention. Such a device comprises means arranged to implement a decryption method as claimed in the third aspect of the present invention.

A fifth aspect of the present invention proposes a computer program product, intended for storage in a memory of a processing unit, or on a removable memory medium, and intended to cooperate with a drive of said processing unit, said computer program product comprising instructions for applying all or some of the steps of the method according to the first aspect of the invention.

A sixth aspect of the present invention proposes a computer program product, intended for storage in a memory of a processing unit, or on a removable memory medium, and intended to cooperate with a drive of said processing unit, said computer program product comprising instructions for implementing all or some of the steps of the method according to the third aspect of the present invention.

Other aspects, aims and advantages of the invention will become apparent from reading the description of one of its embodiments.

BRIEF DESCRIPTION OF THE DRAWINGS

The invention will also be better understood from the drawings, in which.

DESCRIPTION OF PREFERRED EMBODIMENTS

Figure 1:
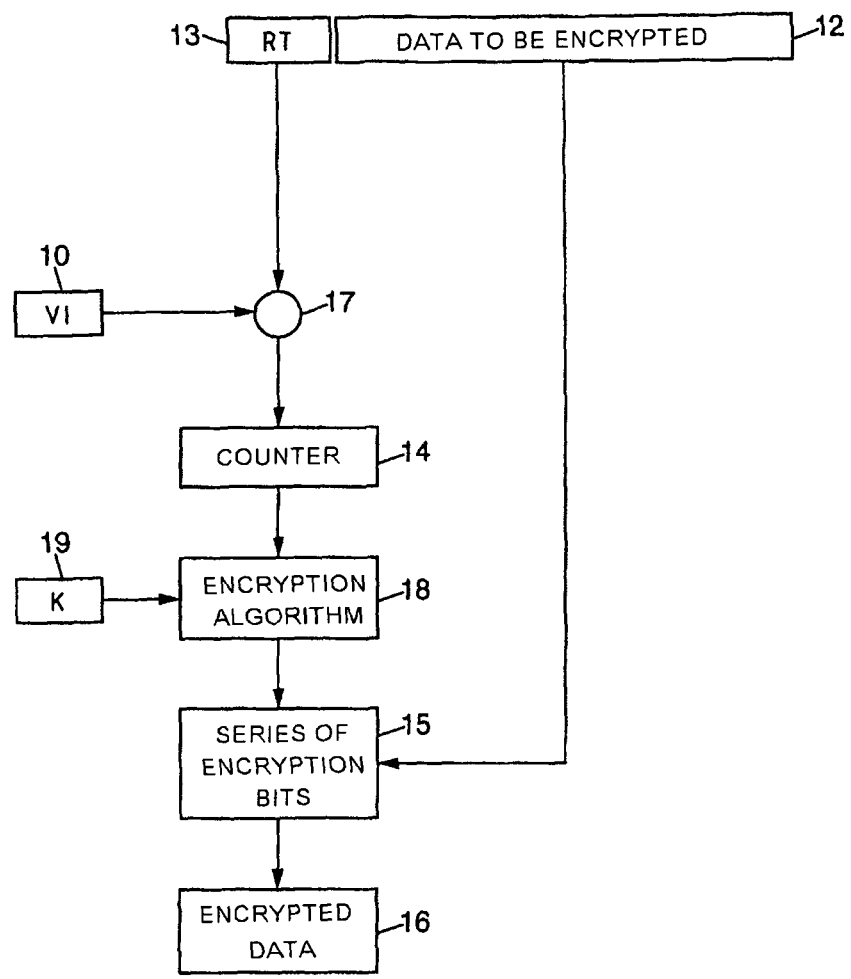
FIG. 1 is a diagram of the steps of an encryption method according to an embodiment of the invention.

FIG. 1 is a diagram of the steps of an encryption method according to an embodiment of the present invention. A data block to be encrypted 12 is associated with a time reference RT 13. First, an initialization vector VI 10 value is defined. An encryption key K 19 is also first defined.

The present invention covers all the means of obtaining an encryption key.

The time reference 13 is combined with the value of the initialization vector 10 by the operation 17. In an embodiment of the invention, this combination corresponds to an exclusive OR operation. The latter is easy to implement. However, the present invention covers any other operation that can be used to generate a series of bits from an initialization vector and from a time reference.

A counter 14 is thus obtained. For a given initialization vector value, the time references associated with each of the data blocks to be encrypted are preferably unique. Such a counter 14 is consequently unique for each of the data blocks to be encrypted. Then, a new value of the initialization vector is preferably defined before values of the time references already associated with data blocks to be encrypted are reused. Consequently, in an embodiment of the present invention, a new initialization vector value is advantageously defined at a frequency that is dependent on the length of the format of the time reference associated with the data blocks to be encrypted.

By thus managing the values of the initialization vector, a counter 14 is obtained which has a unique value for each of the data blocks to be encrypted.

Then, an operation 18 consists in using an encryption function to process the duly obtained counter and the encryption key defined previously. This operation makes it possible to supply a series of encryption bits. Then, by combining the series of encryption bits and the data block to be encrypted 12, the encrypted data block 16 is obtained.

The present invention covers all the encryption functions or even encryption algorithms. Use can advantageously be made of a stream cipher encryption function. In this case, the encryption can be performed bit by bit, or at least without waiting for a data block to be encrypted to be received in its entirety. Such functions are advantageously applied in streaming mode data transmissions.

It is thus possible to use encryption functions well known to those skilled in the art, such as AES type encryption functions (AES stands for "Advanced Encryption Standard", standardized by the NIST, (National Institute of Standards and Technology), in a document referenced NIST FIPS 197 (FIPS standing for "Federal Information Processing Standard")). This type of encryption function advantageously supports encryption keys of a length equal to 128, 192 or even 256 bits, while other encryption functions support only keys of a length less than 128 bits. Thus, the encryption can be more robust.

Figure 2:
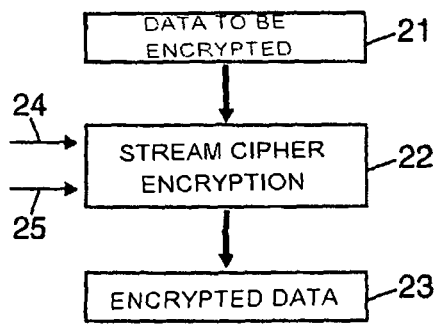
FIG. 2 illustrates the main steps of a "stream cipher" encryption.

FIG. 2 illustrates the main steps of a stream cipher encryption. Thus, a stream cipher encryption function 22 takes a counter as input parameter 24 and an encryption key as input parameter 25 to supply a series of encryption bits. This series of encryption bits is then combined with the data block to be encrypted 21 to ultimately form the corresponding encrypted data block 23.

Then, a duly encrypted data block can then be packetized in one or more data packets to be transmitted via the network.

Figure 3:
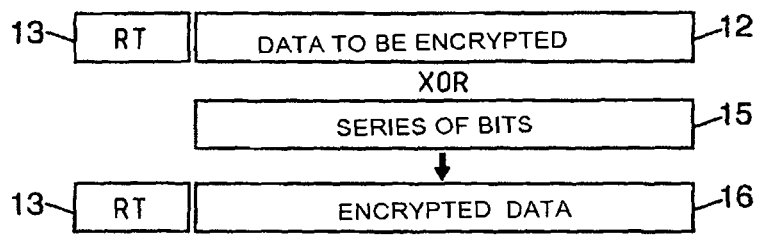
FIG. 3 illustrates an encryption operation according to an embodiment of the present invention by exclusive OR combination.

FIG. 3 illustrates an encryption operation according to an embodiment of the present invention by exclusive OR combination.

The data block to be encrypted 12 is associated with a time reference 13. The series of encryption bits is combined with the data block to be encrypted by an exclusive OR operation to supply the encrypted data block 16. This encrypted data block 16 is associated with the time reference 13, equal to the time reference associated with the data block to be encrypted 12.

A transmission of the duly encrypted data block can then be performed in the same way as for any data block. In practice, according to an embodiment of the invention, the data block to be encrypted and the encrypted data block are of identical lengths. The encryption method has no effect on the packetization and the transmission of the data. As has already been described, the encryption method is advantageously independent of the transport layer of the network used and does not introduce any overhead in the transport of such data.

In an embodiment of the invention, at the end receiving the data, a decryption operation is performed on the received data blocks. Regardless of the transmission method used, whether a received data packet comprises one or more encrypted data blocks, or whether it comprises only a part of an encrypted data block, at the receiving end, the encrypted data block is decrypted. Such an encrypted data block is received in such a way that it is associated with a time reference.

In an embodiment of the present invention, the receiver of the encrypted data blocks is informed of the current value of the initialization vector and of the encryption key used in the encryption method. The present invention covers all the methods enabling the receiver to know this information in a way that is synchronized with its use in the encryption method. Such methods are well known to those skilled in the art.

Moreover, preferably, the decryption method uses the same encryption function as that used in the encryption method used at the sending end.

On receiving an encrypted data block, the same operation of combining the value of the initialization vector and the time reference of the encrypted data block is performed to obtain the same counter as the one obtained in the encryption method used for encrypting the transmitted data. There is then obtained a series of decryption bits which is identical to the series of encryption bits obtained for the data block to be encrypted by supplying the encryption key and the counter as input parameters of the decryption function. Then, a combination operation is performed that is the reverse of the one performed in the encryption method, between the data block to be encrypted and the series of encryption bits, this reverse combination being performed between the encrypted data block and the series of decryption bits. The decrypted data block is thus obtained.

Figure 4:
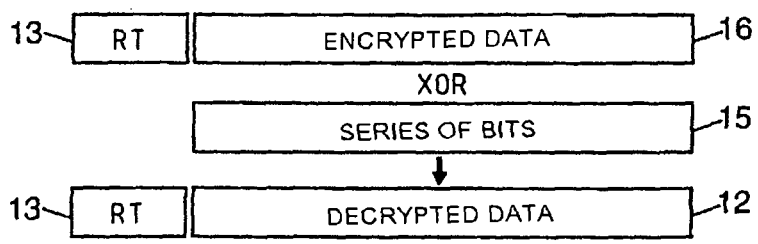
FIG. 4 illustrates an operation for decrypting an encrypted data block, according to an embodiment of the invention.

FIG. 4 illustrates an operation for decrypting an encrypted data block 16 according to an embodiment of the invention, in which the encryption of the data block was performed by an exclusive OR operation between the data block to be encrypted and the series of encryption bits. The encrypted data block associated with a time reference is received at the receiving end. Thus, to decrypt the encrypted data block 16, an exclusive OR operation is performed between the encrypted data block and the series of decryption bits 15. The decrypted data block 12, associated with the corresponding time reference 13 received in association with the encrypted data block 16, is thus obtained.

The following sections detail an embodiment of the invention, in which the data to be transmitted is multimedia data. It can be encoded using an MPEG-4 type protocol. A multimedia data block to be encrypted is hereinafter denoted AU, standing for "Access Unit". Such data can correspond to payload data forming a unit of processing by the encoder and/or the decoder, such as, for example, an image for the transmission of a sequence of images.

As has been described previously, a time reference is associated with each AU. This time reference is encoded on an integer number T of bits. The length of an AU to be encrypted is equal to an integer number L of bits.

An encryption method according to an embodiment of the invention is a stream cipher encryption method. As described previously, a method of this type can be used to encrypt data bit by bit. In order to simplify the implementation of such an encryption method, in an embodiment of the invention, an AU is subdivided into an integer number m of sub-blocks of fixed size. As an illustration, the length of these sub-blocks is fixed equal to 128 bits. Thus, the following equation applies:

$$m=(L \text{ div } 128)+1.$$

$R_L$ denotes the size of the last sub-block of the AU component to be encrypted. The following equation can apply:

$$R_L=(L \text{ mod } 128).$$

There is therefore obtained, by such a subdivision of an AU, a number (m−1) of sub-blocks of a length equal to 128 bits. These sub-blocks are denoted $B_i$, with i being between 1 and m−1. The final sub-block denoted R has a length of $R_L$ bits.

Figure 5:
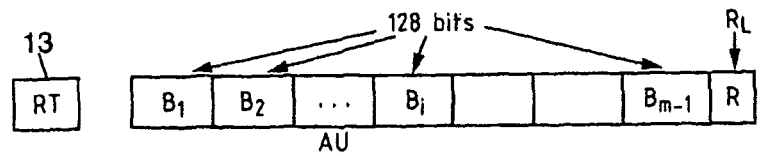
FIG. 5 illustrates an encryption of a data block to be encrypted associated with a time reference according to an embodiment of the present invention in which the data block to be encrypted is subdivided into a plurality of sub-blocks.

FIG. 5 illustrates an encryption of a data block to be encrypted associated with a time reference according to an embodiment of the present invention, in which the data block to be encrypted is subdivided into a plurality of sub-blocks $B_i$ as described above.

Figure 6:
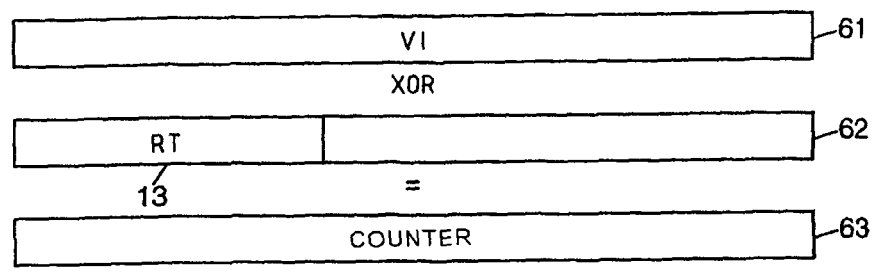
FIG. 6 illustrates a method of generating a counter according to an embodiment of the present invention.

FIG. 6 illustrates a method of generating a counter in an embodiment in which the value of the initialization vector VI 61 is combined with a value generated from the time reference associated with the data block to be encrypted.

In this example, the format of the time reference 13 is less than the predetermined fixed length of the sub-block $B_i$ with i between 1 and m−1. It is then possible to offset the format of the time reference 13 towards the most significant bits and give the least significant bits 62 false values. These least significant bits are, in this example, set to 0. Thus, the value to be combined with the value of the initialization vector 61, in order to obtain a counter, can be expressed as follows:

T bits of the time reference followed by (128-T) bits of 0 value.

Then, the duly obtained value to be combined is advantageously combined with the value of the initialization vector 16 by an exclusive OR operation to obtain the counter C 63.

The present invention covers any other method of generating a value to be combined with the initialization vector from a time reference which has a length less than the initialization vector, in order to obtain a value to be combined of the same length as the initialization vector. In an embodiment of the invention, the recipient(s) know(s) this method in order to be able to decrypt the duly encrypted data, as detailed in other sections.

Also by way of illustration, the encryption method uses an AES type encryption function; more specifically, a 128-bit AES type encryption function in CTR (standing for CounTeR) mode, as standardized in the document referenced NIST SP 800-38A.

Hereinafter, CW is used to denote the encryption key. This key preferably has a length equal to 128 bits. The initialization vector also preferably has a length equal to 128 bits. A value of the initialization vector is denoted VI.

AES (CW, x) is used to denote the series of encryption bits obtained via the AES encryption function taking the encryption key CW and a counter x as input parameters.

Elsewhere, "XOR" is used to denote the exclusive OR operation.

The encryption function E is defined so that, for each sub-block $B_i$ of a data block to be encrypted, i being between 1 and m−1, the following equation applies:

$$E(B_i)=B_i XOR AES(CW,C+i).$$

For the final sub-block R of length $R_L$ bits, the following equation applies:

$$E(R)=R XOR [\text{first } R_L \text{ bits of } AES(CW,C+m)].$$

Then, the duly encrypted AU can be transmitted.

The encryption method is then repeated for each AU.

Figure 7:
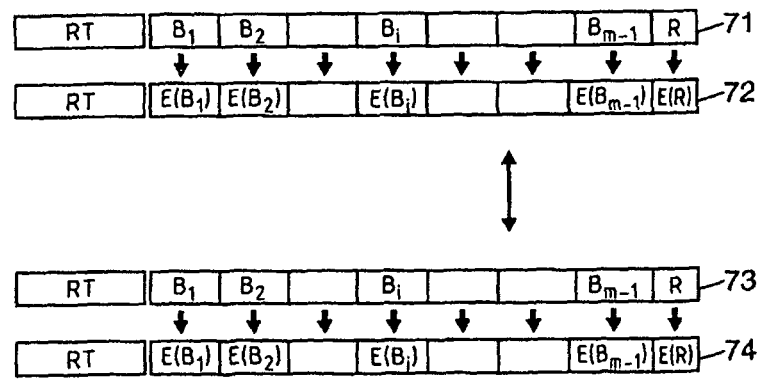
FIG. 7 illustrates an encryption and a decryption of a data block subdivided into a plurality of sub-blocks according to an embodiment of the present invention.

FIG. 7 illustrates an embodiment of the present invention as described above. In a first part, the encryption of a first AU 71 is illustrated. The first AU is subdivided into m sub-blocks as has already been described. Then, for each sub-block $B_i$ of the first (m−1) sub-blocks, $E(B_i)$ is obtained. Then, for the final sub-block R, E(R) is obtained.

The duly encrypted AU 72 is associated with the time reference 13 with the same value as the time reference already associated with the AU to be encrypted.

In a second part, the encryption of a second AU 73 in an encrypted AU 74 is illustrated.

It will be noted that the first and the second AU are advantageously encrypted independently.

In an embodiment of the present invention, a method of decrypting duly encrypted data is based on the decryption function denoted D which satisfies the following equation, for each sub-block $B_i$, i being between 1 and m−1:

$$D(Bi)=E(Bi) XOR AES(CW,C+i).$$

For the final sub-block R, the following equation applies:

$$D(R)=E(R) XOR [\text{first } R_L \text{ bits of } AES(CW,C+m)].$$

Figure 8:
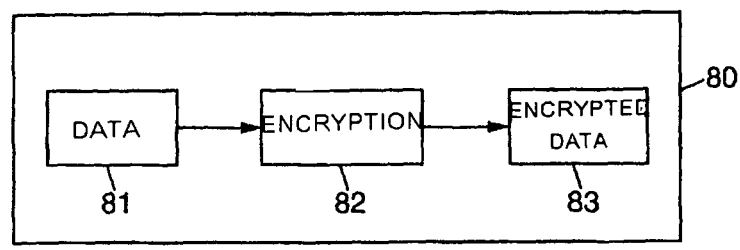
FIG. 8 illustrates an encryption device according to an embodiment of the invention.

In an embodiment of the present invention, an encryption device advantageously implements an encryption method according to the invention. FIG. 8 illustrates such an encryption device 80, comprising an entity 81 for storing the data to be encrypted, an entity 82 for encrypting the data to be encrypted and an entity 83 for storing the encrypted data.

Figure 9:
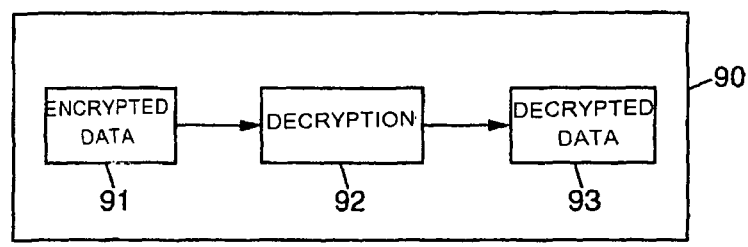
FIG. 9 illustrates a decryption device according to an embodiment of the invention.

In an embodiment of the present invention, a decryption device advantageously implements a decryption method according to the invention. FIG. 9 illustrates such a decryption device 90, comprising an entity 91 for storing the encrypted data to be decrypted, an entity 92 for decrypting the data to be decrypted and an entity 93 for storing the decrypted data.

Data encrypted by a method according to the invention can advantageously be stored on any digital data storage medium.

In an embodiment of the present invention, the decryption method advantageously uses the same encryption algorithm as the one used in the encryption method. It preferably generates the same counter as the one generated in the encryption method from the time reference associated with the encrypted data block, which is identical to the one associated with the corresponding data block to be encrypted. The value of the initialization counter is synchronized between the end sending the encrypted data and the receiving end. Consequently, the received encrypted data is advantageously decrypted without having to transport information specifically for encryption.

An encryption and decryption method according to an embodiment of the invention can advantageously be implemented in the streaming transmission devices.

The present invention can offer great flexibility regarding the size of the data blocks to be encrypted and therefore makes it possible to encrypt data blocks of very variable sizes. The invention enables multimedia data to be transmitted over multi-vendor transport networks. In practice, the invention can be applied to any medium for transporting data blocks associated with a time reference value.

Furthermore, the invention advantageously makes it possible not to propagate an error in the event of loss of a data packet since a data block can be encrypted independently of the other data blocks to be encrypted.

The invention claimed is:

1. A method of encrypting digital data blocks, wherein each digital data block represents an image in a sequence of images, each image to be encrypted being associated with a time reference, following which a value of an initialization vector and an encryption key are defined, said method comprising, for each image to be encrypted, steps consisting in:

obtaining at a processing unit a counter, by combining said time reference and said value of the initialization vector;

obtaining at the processing unit a series of encryption bits via an encryption function taking said encryption key and said counter as input parameters;

encrypting said image by combining said image at the processing unit with said series of encryption bits.

2. The method as claimed in claim 1, wherein a new value of the initialization vector is defined at a frequency such that the time references associated with the image to be encrypted are unique for a given value of the initialization vector.

3. The method of claim 1 wherein combining the time reference and the value of the initialization vector comprises an exclusive OR operation.

4. The method of claim 1 wherein combining the image to be encrypted and the series of encryption bits comprises an exclusive OR operation.

5. The method of claim 1 wherein the encryption function is an AES-type function.

6. The method of claim 1 wherein the image to be encrypted is subdivided into a plurality of sub-blocks of determined fixed length, the final sub-block being of shorter length if necessary, and wherein each of said sub-blocks is encrypted, one sub-block at a time.

7. The method as claimed in claim 6, wherein:

the predetermined fixed length is equal to B bits, B being an integer number;

the image to be encrypted is L bits long, L being an integer number greater than said integer number B;

the associated time reference is T bits long, T being an integer number less than said integer number B;

the initialization vector is B bits long;

wherein a binary value is determined for the time reference on B bits, the T most significant bits corresponding to said time reference, the (B-T) least significant bits being of 0 value, and wherein the counter is obtained by an exclusive OR operation between the binary value of said time reference on B bits and the value of the initialization vector.

8. The method of claim 1 further comprising a subsequent step for encoding encrypted images before transmitting the encrypted and encoded images.

9. The method of claim 1 further comprising a subsequent step for storing the encrypted image on a removable memory medium.

10. A device for encrypting digital images, each image to be encrypted being associated with a time reference, wherein a value of an initialization vector and an encryption key are defined, said device comprising means arranged to implement an encryption method as claimed in claim 1.

11. A method of decrypting digital images, each image to be decrypted being associated with a time reference, said images being encrypted by an encryption method as claimed in claim 1, wherein a value of an initialization vector and an encryption key are defined synchronized with the value of the initialization vector and the encryption key used in said encryption method, said decryption method comprising, for each image to be decrypted, steps consisting in:

obtaining a counter, by combining said time reference and said value of the initialization vector;

obtaining a series of decryption bits via a decryption function taking said encryption key and said counter as input parameters, said decryption function being equivalent to the encryption function used in said encryption method;

decrypting said encrypted image by combining it with said series of decryption bits, via a combination that is the reverse of that used in said encryption method.

12. The method as claimed in claim 11, wherein the image to be decrypted is subdivided into a plurality of sub-blocks of determined fixed length, the final sub-block being of shorter length if necessary, and wherein each of said sub-blocks is decrypted, one sub-block at a time.

13. The method as claimed in claim 12, wherein:

the determined fixed length is equal to B bits, B being an integer number;

the image to be encrypted is L bits long, L being an integer number greater than said integer number B;

the associated time reference is T bits long, T being an integer number less than said integer number B;

the initialization vector is B bits long;

wherein a binary value of the time reference is determined on B bits, the T most significant bits corresponding to said time reference and the (B-T) least significant bits being of 0 value, and wherein the counter is obtained by an exclusive OR operation between the binary value of said time reference on B bits and the value of the initialization vector.

14. A device for decrypting digital images, each image to be decrypted being associated with a time reference, and being encrypted by an encryption method as claimed in any one of claims 1 to 5 and 6 to 9.

15. A computer program product, intended for storage in a memory of a processing unit, or on a removable memory medium, and intended to cooperate with a drive of said processing unit, said computer program product comprising instructions for implementing of the method as claimed in any one of claims 1 to 5 and 6 to 9.

16. A computer program product, intended for storage in a memory of a processing unit, or on a removable memory medium, and intended to cooperate with a drive of said processing unit, said computer program product comprising instructions for implementing of the method as claimed in any one of claims 11 to 13.

17. A device for decrypting digital images, each image to be decrypted being associated with a time reference, wherein said device comprises a means arranged to implement a decryption method as claimed in any one of claims 11 to 13.

* * * * *